United States Patent [19]

LaLiberte et al.

[11] 4,238,524
[45] Dec. 9, 1980

[54] PROCESS FOR IDENTIFICATION MARKING CLEAR PLASTIC ARTICLES

[75] Inventors: Norman U. LaLiberte, Woodstock, Conn.; Don H. Rotenberg, Westboro, Mass.

[73] Assignee: American Optical Corporation, Southbridge, Mass.

[21] Appl. No.: 883,768

[22] Filed: Mar. 6, 1978

[51] Int. Cl.³ .................. G02B 1/10; C09K 11/00
[52] U.S. Cl. .................................... 427/7; 8/507; 427/145; 427/157
[58] Field of Search ............... 427/1, 2, 7, 145, 157, 427/158, 164, 282; 8/1 W, 4, 164; 428/913; 118/31.5; 106/21; 351/51, 159; 264/1, 2

[56] References Cited

U.S. PATENT DOCUMENTS

| 3,625,731 | 12/1971 | Taylor | 8/4 X |
|---|---|---|---|
| 3,646,054 | 2/1972 | Kiechmayr et al. | 106/21 X |
| 3,683,336 | 8/1972 | Brownlee et al. | 427/157 X |
| 3,740,402 | 6/1973 | Cevasco | 106/21 X |
| 3,837,890 | 9/1974 | Sumner et al. | 8/164 X |
| 3,944,637 | 3/1976 | Bond et al. | 351/159 X |
| 4,039,827 | 8/1977 | Zdrok et al. | 264/1X |

FOREIGN PATENT DOCUMENTS 620367   3/1949   United Kingdom ............ 106/21

Primary Examiner—James R. Hoffman
Attorney, Agent, or Firm—Jeremiah J. Duggan; Alan H. Spencer

[57] ABSTRACT

A fade resistant, visually undetectable identification mark is imparted to an optically clear plastic lens or the like by providing a marking composition comprising a fluorescent dye and a liquid carrier material, and preferably including an inert sublimable solid diluent, applying the composition in a selected pattern on the surface of an article to be marked, removing the carrier material from the composition to leave a solid residue of the fluorescent dye and inert solid diluent, and permanently transferring the dye to a surface layer of the article as by heating. The mark enables a manufacturer to identify a particular article as its product by exposing it to ultraviolet radiation, yet the mark does not adversely affect the visible light optical properties of the article.

14 Claims, 1 Drawing Figure

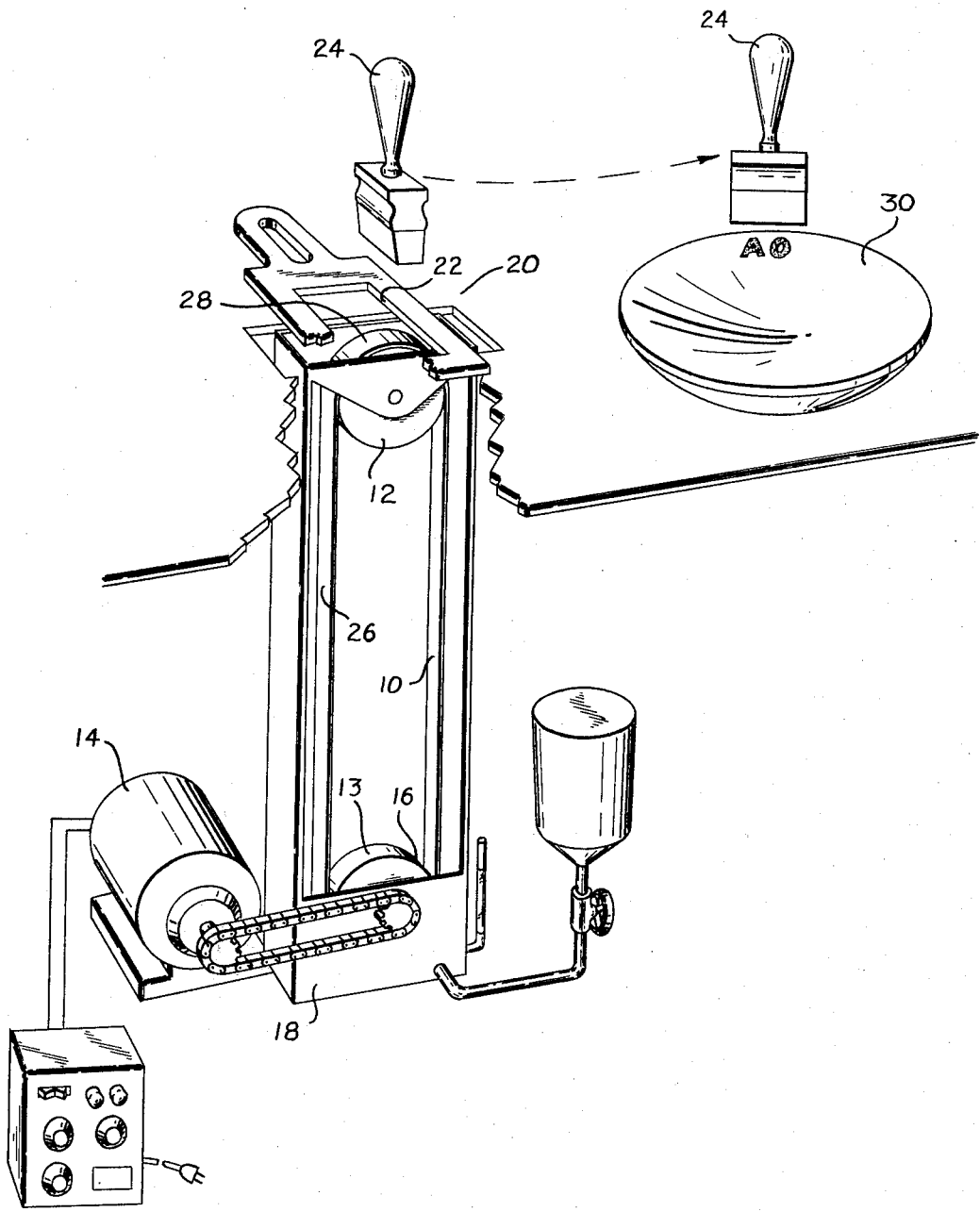

PROCESS FOR IDENTIFICATION MARKING CLEAR PLASTIC ARTICLES

BACKGROUND OF THE INVENTION

This invention relates to a process for imparting a permanent identification mark to an optically clear plastic article such as a lens. More particularly, it relates to a method of marking which enables a manufacturer to confirm that a returned article which had been distributed to the consumer is in fact its own product, yet results in a mark which has no material effect on the passage of visible light through the product.

Ophthalmic quality plastic lenses made of allyl diglycol carbonate (CR-39), polycarbonate (Lexan), and the like are now widely available. These products are distributed to the consumer through retail outlets which frequently sell products of more than one manufacturer. When a defective or damaged lens which has been mounted in an eyeglass frame is returned, it is often impossible to determine the identity of the lens' manufacturer.

An apparent way to remedy this difficulty is to provide an integral indicia of some kind or otherwise build within the lens structure a unique and identifiable characteristic. A satisfactory method of marking products of this type has not yet been found. Since ophthalmic quality lenses must be optically clear and cosmetically perfect they cannot be provided with a surface embossed design or colored mark which is permanently on or in the lens. Such a mark would likely be viewed as an imperfection or a flaw in the optical quality of the lens. Were the mark so small as to be clearly free of these disadvantages, it would likely be too small to be of practical value.

In most cases, the manufacturer distributes the products to retailers, such as optical laboratories, in the form of lens blanks which thereafter cut the blank to a lens size and subsequently glaze the lens into a frame. Because of this distribution procedure and because of the expense involved, it is not practical to affix an identifying mark on an edge of the lens which would be hidden by the eyeglass frame. Furthermore, because the mark must be permanent, the simple expedient of affixing a removable label on the lens is inappropriate.

The ideal identification mark for an optically clear lens should leave no flaw or blemish of any kind on the lens surface, should be permanent, should not be visually detectable, and should be easily applied at the factory site on both lenses and lens blanks.

With the above thoughts in mind one might be invited to conclude that the indicated solution of the present problem would be an invisible mark since such marks are widely known in the securities and banking field. Flourescent inks as applied to various documents such as bills and notes might be argued to suggest a solution for the present problem by stamping the ophthalmic lens with a fluorescent ink. Unfortunately the solution of the problem is not so straight forward as might be suggested. Plastic articles are not absorbent to the degree that papers and fabrics are. Further, any ink mark applied to the article would be very readily wiped clean by the normal action of cleaning ones eyeglass lens.

It is further desirable that the mark placed upon the plastic article (ophthalmic lens) be in a relatively small form such that inadvertent observation might not be a major distraction to the wearer or those about him. It is necessary therefor that the identifying mark be placed upon the article in rather small fashion and be of fairly high resolution. It has been found that inks and other liquids have a profound tendency to run on the surface of a plastic article, spreading in all directions with little controllability. For these and the above reasons, fluorescent inks such as known for use in the securities trade are not acceptable for solution to the present problem.

So the problem faced in the present invention then demands marking by other than a conventional liquid. Again those familiar with the fluorescent inks might be led to conclude that, since some inks are in fact fluorescent powders in solution, one might use powder to place an indication on the lens. This approach generates a problem of adhesion to the lens since the powders do not readily adhere. Should the powder be desolved in the ink liquid, the situation reverts to a marking liquid being placed upon the surface of the plastic article.

The present problems are solved in the invention by the method of marking the article with a fluorescent powder preferably in combination with powder diluent. These powders or solids are initially contained in a carrier liquid, perferably in solution, however suspensions are acceptable. The powders are then applied to the lens with the mixture (dye and carrier) in a super-saturated condition, such that the characteristics of the marking composition are not truly that of either a liquid or a powder. The composition might be compared to a paste or slurry.

In addition to the problems of application of the suitable dye for marking the plastic article there is also a problem of adequately applying the proper amount of dye such that a readily recognizable, high resolution small mark can be placed upon the article, e.g. one having a predetermined limited degree of ultraviolet response when activated. It is therefore necessary to meter the amount of dye being used during the marking process.

Characteristically, fluids are metered by the relative concentrations of components in a solution or suspension. In the present invention, however, the marking composition is not characteristically a liquid. A further problem in the present invention is that the concentrations of the marking solution are continually changing due to the necessity of having to mark the article with a super-saturated solution or suspension. We have found that by causing the carrier solution to volatilize such that the super-saturated state of the marking composition can be reached. This volatilization necessarily means that relative concentration of the ingredients including the dye continue to increase in concentration unless extraordinary measures are taken. The concentration of dye may thus reach a level which produces a mark which is over-responsive and thus unsatisfactory.

With this in mind, we use a very small quantity of dye material and perferably dilute the dye in a second powder. Peculiarly however, the characteristics of the powder must be markedly different than the dye so as to not interfere with the process by which the dye forms the permanent mark on the plastic article. We thus utilize a powder diluent which during the process of transferring a dye material to the face of the plastic article sublimes into the surrounding atmosphere so as to leave no trace of the diluent material on the face of the marked plastic article.

SUMMARY OF THE INVENTION

The process of the instant invention imparts a permanent identification mark to optically clear plastic articles, including but not limited to ophthalmic quality plastic lenses, without adversely affecting the article's visible light optical properties. In the process, a predetermined small amount of ultraviolet light-activatable fluorescent dye is mixed with a volatile liquid carrier material to form a suspension or solution comprising a marking composition. A soluble or suspendable inert sublimable solid diluent can also be utilized to improve the control over the marking process. The marking composition is then applied in a selected pattern on a surface of the optically clear plastic article by a carrier means, for example, a rubber stamp or a stencil whereon the dye is in a supersaturated solution or suspension. Thereafter, the carrier material evaporates from the applied composition to leave a residue of solid dye and inert sublimable solid diluent in the chosen pattern on a surface of the article. The amount of dye on a given area of the article is thereby metered so that, after transfer, the degree of fluorescent response obtained is such that bright sunlight does not activate the dye to a visually detectable level, yet the mark is visible under direct U.V. radiation from any long wave U.V. lamp. That the dye and inert diluent immediately prior to permanent transfer to the plastic article are in solid form (powder) is important because liquid formulations have been found to produce a poor quality mark due to "running" of the dye. The article is then heated to a selected temperature below the temperature at which the plastic material from which it is made begins to degrade, but at an elevated temperature such that the powder dye may migrate into the surface-subsurface structure of the plastic article.

In preferred embodiments, the marking composition is a solution of fluorescent dye, although suspensions may also be used.

The marking composition solution comprises the carrier (a volatile liquid) and the fluorescent dye. The ratio of quantities is such that, at the time of application of composition to article, the solution has become supersaturated e.g., by evaporation of the volatile carrier during the transit of the marking instrument from a supply container to the article being marked.

A preferred marking composition comprises ethyl acetate, one or more of the crystalline or powdered fluorescent dyes commonly used as fluorescent whitening agents (see G. W. Broadhurst and A. Wieber, Ciba-Geigy, *Plastics Engineering*, 29, No. 9, 36 September 1973), such as 3 phenyl-7-triazinylamino-coumarin, stibene naphthotriazole, benzotriazol phenyl coumarin, thiophene bis (benzoxazolyl), and other substituted derivatives of these structures, as well as other triazinylaminostilbenes, coumarins, bis-benzoxazolyls, benz-triazoyls, pyrazolines, naphthalic acid imides, and bis-styryl benzenes, and other derivatives such as those available commercially from Ciba-Geigy Corporation under the trademark Uvitex OB and Tinopal SFG. Other useful derivatives are Leucopure EGM from Sandoz Color & Chemicals Co. and Eastobrite PF from Eastman Chemicals Co. Preferably also, an inert sublimable solid diluent such as benzoic acid, salicylic acid, meta- hydroxybenzoic acid, or the aromatic carboxylic amide-ester mixture sold by duPont under the trade name Latyl A is included in the marking composition. The mark on the optically clear plastic article is preferably applied with a rubber stamp and is transferred into the surface of the article by heating in an oven or by infrared radiation.

While the process of the invention may be employed to mark a variety of clear plastic materials, a preferred plastic material is a "colorless" allyl diglycol carbonate (CR-39), i.e., an ophthalmic quality plastic which has been treated in accordance with the teachings of copending application Ser. No. 749,901, now U.S. Pat. No. 4,108,827 entitled "Colorless Allyl Diglycol Carbonate Articles" to eliminate the slight yellow color normally characteristic of cast products made from this material.

Accordingly, it is an object of the invention to provide a method of identification marking an optically clear plastic article without adversely affecting its visible light optical properties.

Another object is to provide an identification mark which, although undetectable by visible light, may readily be detected by subjecting the marked article to ultraviolet radiation from a U.V. lamp to cause the mark to fluoresce.

Still another object of the invention is to provide an identification marking system suitable for use on various optically clear plastics made from materials such as allyl diglycol carbonate (CR-39), polycarbonate (Lexan), polyacrylates (including polymethacrylates and polymethyl methacrylate), cellulose acetate, cellulose acetate butyrate, cellulose propionate, and homopolymers or copolymers thereof.

Another object of the invention is to provide a unique method of identifying clear plastic articles by providing a mark thereon that is not visible in ordinary light and does not mar the lens cosmetically or affect its optical performance.

DESCRIPTION OF THE DRAWINGS

The FIGURE is a pictorial view of apparatus used in practicing the invention.

DESCRIPTION OF THE PREFERRED EMBODIMENT

In the process of the invention, a preferred marking composition is prepared from a powered fluorescent dye, an inert sublimable solid and a carrier. Various commercially available and well-known fluorescing dyes may be used, but the preferred dyes are derivatives which are available commercially. The dye must be capable of migrating into the surface-subsurface structure of the plastic article without degradation thereof.

The purpose of the carrier is to provide a vehicle which enables the application of the powder dye to the surface of an optically clear plastic article. In this regard, the carrier material should be selected from among those liquids which do not adversely affect the material from which the optically clear plastic article is made. Thus, the carrier should not dissolve or swell the plastic material which is to be marked. For example, acetone should not be used in a composition intended for marking cellulosic articles. For allyl diglycol carbonate articles, suitable liquid carriers include ethyl acetate, simple esters, alcohols, and ketones, water, and mixtures of alcohol and water. Likewise the carrier must exhibit sufficient volatility such that the dye may be maintained in solution or suspension in the carrier while being maintained in a supply vessel and thereafter become a supersaturated solution or suspension during the time period when the marking composition is being transported from the supply vessel to the article being marked.

As previously mentioned it is preferred that the marking composition comprise a solution of the selected dye and inert sublimable solid diluent in the carrier. However, liquid carrier materials in which the dye and solid diluent are insoluble or sparingly soluble may be employed. The marking composition may comprise a suspension. It is also preferred that the inert sublimable solid diluent be dissolved or suspended in a similar manner.

The amount of fluorescent dye and solid diluent included in the marking composition should be sufficient to leave a fine residue of powdered dye and solid diluent on the surface of the article after the carrier has completely evaporated therefrom. The composition is initially applied in what might be otherwise described as a thin film of the marking composition applied to the lens. Sufficient dye should be present on the lens surface so that the fluorescent response of the finally formed mark is readily seen when irradiated with ultraviolet light from a U.V. lamp, yet not noticeable in the presence of sunlight (which of course includes ultraviolet wavelengths). Thus, the percent by weight dye of included in the marking composition depends on the thickness of the film applied to the article and on the characteristic strength of the fluorescent response of the selected dye. Accordingly, the amount of specifically determined "optimum" by the user may have to be adjusted when employing a given dye on a given article in order to determine the "optimum" response.

One suitable marking composition particularly well adapted for use on allyl diglycol carbonate articles consists of a solution of 0.15% by weight of a bis (benzoxazolyl) derivative, (e.g. Uvitex OB dye) and 1.25% by weight of an aromatic carobxylic amide-ester (e.g Latyl A) dissolved in ethyl acetate (e.g. 800 ml) as the carrier. Specific non-limiting examples of dyes that may be used include thiophene bis(benzoxazolyl), 3 phenyl-7-triazinylamino-coumarin, stilbene naphthotriazole, and benzotriazole phenyl coumarin, triazinylaminostilbenes, coumarins, bis-benzimidazolyls, bis-benzoxazolyls, benz-triazoyls, pyrazolines, naphthalic acid imides, and bis-styryl benzenes.

It should be noted that the above preferred composition as well as those previously and generally described include an additional ingredient identified as a "solid diluent". We have found it difficult, however not impossible, to continuously meter the amount of dye suspended or in solution in the carrier. Since it is preferred to deposit very small amounts of the dye on the surface of the article to be marked, it is convenient to additionally dissolve or suspend in the carrier the diluent material, also a powder, thereby raising to an easily meterable level the total amount of powder to be applied to the article.

The diluent is chosen so that at the operative temperature for causing the dye material to migrate or be finally adsorbed into the marked article, the diluent sublimes into the surrounding atmosphere. Specific non-limiting examples of diluents that may be used include benzoic acid, salicylic acid, meta-hydroxybenzoic acid, and Latyl A, an aromatic carboxylic ester-amide mixture made by Dupont.

As with chosing a carrier, the characteristics of the diluent must be such that it causes no degradation of the surface of the marked article or the response or absorbtion of the dye. The identified Latyl is such a material when used in ethyl acetate on allyl diglycol carbonate articles in conjunction with the Ciba-Geigy dye Uvitex-OB.

The next step in the process is to apply the marking composition in a pattern in the form of the desired mark to a surface of the plastic article. The mark may, for example, be a registered trademark, corporate logo or the like. There are various suitable ways to effect this step. For example, the composition may be applied with a marking device such as a felt tip pen or a stencil may be employed. The preferred method of imparting a pattern of the composition on the article is to imbibe the composition in a pad-type device, take up a thin film of composition on a rubber stamp from the pad, and stamp the article in the desired surface location. For curved surfaces, a rolling motion may be used.

In the preferred practice of applying a mark to a plastic article such as an ophthalmic lens, apparatus such as illustrated in FIG. 1 may be used. In that Figure reference numeral 10 indicates a belt-type pad which is disposed to rotate on two rolls 12 and 13. Rotary power from such as electric motor 14 may be supplied to one or both of the rolls (e.g. the bottom roll 13). Carrier solution 16 is contained in vessel 18 such that roll 13 bearing pad 10 is at least partially submerged in carrier solution 16.

For convenience in multiple marking the described apparatus may be disposed at a marking station 20 such that roll 12 is table high and exposed through such in slot 22 for access. As pad 10 is rotated on roll 12, it is exposed to be contacted by stamp 24 such that carrier solution including the dye for marking and, if included, diluent are available to be picked up on the stamp and transferred to the plastic article 30 to be marked.

As previously indicated, it is preferred that carrier solution 16 contain the diluent and/or dye in solution or suspension such that these materials are uniformly concentrated thereon. As a given point 26 on pad 10 rotates from a submerged position, as on roll 13 to a fully exposed position 28 as on roll 12, the carrier solution may evaporate such that at point 28 the diluent and/or dye are supersaturated in solution (or suspension) to the desired degree to be effectively transferred to the face of stamp 24. It should be recognized that further evaporation of the carrier solution on stamp 24 may continue until the diluent-dye solution/suspension is transferred to the plastic article 30.

After deposition of the marking material, the carrier is selectively removed from the surface of the article such as by evaporation to leave a residue of solid diluent and/or dye in the selected pattern. Dyes and diluents that are liquid at room temperature are not employed because they tend to spread and penetrate the plastic surface prior to being heat treated and result in a mark which is not sharply defined. Since the marking composition comprises a volatile carrier, it spontaneously evaporates at room temperature.

Following application of the mark to the article, the mark is permanently transferred into a surface layer of the article by being heat treated.

In the disclosed preferred system, this diluent and/or dye powder is placed on the article and upon heating, the dye powder particles are adsorbed into the surface of the article. Likewise, because of the sublimating character of the diluent, upon heating it volatilizes into the atmosphere of the heating chamber.

The duration and temperature of the heating step necessarily depends on the affinity of the material from which the article is made for the fluorescent dye of the marking composition. In no event should the heating be conducted at a temperature at which the article, the diluent or dye will begin to degrade. In the best method herein disclosed, heating occurs to a point above the glass transition temperature of the allyl diglycol carbonate (about 70° C.) and below the melting point of the dye (about 200° C.).

Two heating methods have been used with success. A first and presently preferred method is to heat the article in an oven. The second method is to heat the article with an infrared lamp. To illustrate the relationship between the temperature of the heating step and its duration and the relationship between the distance of the infrared lamp from the article and the duration of exposure, 66 mm allyl diglycol carbonate lenses and some lens blanks were treated as disclosed above with a marking composition consisting of 1½% by weight Uvitex OB in ethyl acetate. In this first example the marking compound was maintained in a conventional "stamp pad" and, the carrier solution allowed to volatilize until the solution supersaturated. This condition was detected by noting the beginning of formation of small powder granules on the pad. The logo stamp was then pressed into the pad and subsequently onto the face of the lens.

Table I sets forth the time required at various oven temperatures to set the marks to a "very good" fluorescence, i.e., a mark of detectable but not excessively bright fluorescence. Longer times than those stated in Table I also produce excellent fluorescent dye transfer, but increase the risk that the lens will become marred. Shorter times range in effect from no transfer to an adequate but less than optimum transfer. The "very good" condition is recommended because it allows the mark to readily be detected under UV light generated from a lamp, but substantially invisible in bright sunlight. Also, when in the "very good" condition, the lens may be subsequently dyed to a sunglass transmittance while still maintaining an observable fluorescent mark.

TABLE I

| Oven Temperature (°F.) | Time | |
|---|---|---|
| | 66 mm finished lens | 65 mm semi-finished blanks |
| 160 | 20 hours | — |
| 180 | 3-4 hours | — |
| 200 | 35 mins. | — |
| 220 | 25 mins. | 30 mins. |
| 250 | 15 mins. | 20 mins. |
| 265 | 10 mins. | — |
| 280 | 7½ mins. | — |
| 300 | 5 mins. | — |
| 310 | 4 mins. | — |

The results of the foregoing experiments were not consistent at 160° F. The larger lens blanks, which were not run at all temperatures, were observed to generally require about 5 minutes extra heating time.

Table II sets for the results of setting the fluorescent dye to the "very good" condition using an infrared lamp (G.E. 25OR 40/10).

TABLE II

| Distance, Lamp to Base | Time | |
|---|---|---|
| | 66 mm Finished lens | 65 mm semi-finished lens blanks |
| 1 inch | 3 mins. | 4 mins. |
| 2 inches | 3½ mins. | 5¼ mins. |
| 3 inches | 4 mins. | 6¼ mins. |

TABLE II-continued

| Distance, Lamp to Base | Time | |
|---|---|---|
| | 66 mm Finished lens | 65 mm semi-finished lens blanks |
| 5 inches | 6 mins. | 6¼ mins. |
| 6½ inches | 7 mins. | 7 mins. |

The foregoing procedure results in a surface layer of the plastic article containing a pattern of fluorescent dye. The cosmetic appearance and optical properties of the lenses and lens blanks used were not altered in any way and the mark was not visually detectable under either a shadowgraph or bright light. Heating the lens or lens blank to set the dye in a surface layer thereof enabled the mark to withstand boiling water, washes in acetone, immersions in color remover for a half-hour and normal processing procedures.

Table III sets forth the ranges of fluorescent dye alternatively including the powder diluent which were used to produce marking. In all instances the dye and diluent were mixed into 800 ml of carrier, which for these examples was ethyl acetate.

TABLE III

| Run | Dye (in grams) | Diluent (in grams) |
|---|---|---|
| 1 | 0.16 | — |
| 2 | 0.24 | — |
| 3 | 0.32 | — |
| 4 | 0.48 | — |
| 5 | 0.64 | — |
| 6 | 1.20 | — |
| 7 | 1.0 | 9.6 |
| 8 | 1.0 | 14.4 |
| 9 | 1.0 | 23.4 |
| 10 | 0.9 | 4.8 |
| 11 | — | 4.8 |
| 12 | — | 9.6 |

The above materials were run in the illustrated moving pad device to control the degree of saturation/supersaturates of the marking composition. Time of exposure of the volatile carrier on the pad ranged from 1.3 to 18 minutes for acceptable marking. The optimum time seemed to be about 5.7 minutes. Times of under 1.3 minutes produced wet stampings, which were acceptable, however, showed beginning traces of running.

Other dye materials which have been used and found acceptable are Tinopal SFG from Ciba-Geigy Corporation, Leucopure EGM from Sandoz Color and Chemicals Company and Eastobrite PF from Eastman Chemicals Company. These dye materials were found to be effective in the range of percentages of the Uvitex OB dye in Table III. Though the solubility of these materials in the carrier material varies, it is predictable and similar to the Uvitex OB for example. As the concentration of dye in the carrier in vessel 18 approaches maximum solubility, the quantity which precipitates out during the supersaturated phase on belt 10 cannot all be redissolved in carrier on reimmursion such that build up of material occurs on continued usage. It is thus preferred that the solution be at a concentration below such "build up" level, and may be easily determine empirically for the various materials.

The additional sublimable powders of metahydroxybenzoic acid and benzoic acid were substituted for Latyl A as the diluent material. The metahydroxybenzoic acid was found to be useable approximately in the same concentrations as the Latyl A, while benzoic acid use was optimized at a concentration of about three times Latyl A. This variance is suggested by the ratios of solubility of the various diluents. The diluents also exhibited a similar "build up" behavior as the dyes.

Acceptable setting or curing temperatures for dyes and diluents were found to be similar to the Unitex OB and Latyl A materials.

Having thus described our invention in detail and with sufficient particularity as to enable one skilled in the art to practice the invention, what is desired to be protected by Letters Patent is set forth in the following claims. Likewise, variations and modifications which do not depart from the spirit and scope of such claims will be evident to those skilled in the Art.

What is claimed is:

1. A process for imparting a permanent identification mark to an optically clear plastic article without adversely affecting its visible light optical properties, said process comprising the steps of:
   (a) mixing a solid ultraviolet light activatable fluorescent dye with a liquid carrier material to produce a marking composition;
   (b) mixing a solid sublimeable inert diluent with said dye and said liquid carrier;
   (c) causing at least a portion of said carrier to evaporate so that said dye and said solid diluent form a paste in said liquid carrier;
   (d) applying a pattern of said paste marking composition to a surface of the optically clear plastic article;
   (e) evaporating a remaining portion of said carrier material from the surface of the article to leave a residue of solid dye and solid diluent in the pattern on said surface, the amount of dye on said surface being sufficient to induce a readily detectable fluorescent response when irradiated with light from a U.V. lamp, yet insufficient to produce a visually detectable response in the presence of sunlight; and
   (f) heating the surface of the article to a selected temperature below the degradation point of the plastic for a sufficient amount of time to transfer the dye into a surface layer of said article to result in a fade resistant mark and to sublime said solid diluent.

2. The process as set forth in claim 1 wherein the article is an ophthalmic quality lens.

3. The process as set forth in claim 1 wherein the marking composition is a solution of said dye.

4. The process as set forth in claim 3 wherein the solvent in the solution is selected from the group consisting of, simple esters, alcohols, and ketones.

5. The process as set forth in claim 1 wherein the heating step is effected in an oven.

6. The process as set forth in claim 1 wherein the article comprises allyldiglycol carbonate and the marking composition comprises a solution of ethyl acetate and a crystalline dye selected from the group consisting of 3-phenyl-7-triazinylamino coumarin, stilbene naphthotriazole, benzotriazol phenyl coumarin, thiophene bis (benzoxazolyl), other fluorescent derivatives of bis (benzoxazolyl), bis-benzimidazolyl, coumarin, triazinylaminostilbenes, benztriazolyl, pyrazoline, bis-styryl benzenes, and mixtures thereof.

7. The process as set forth in claim 1 wherein the optically clear plastic article comprises allyl diglycol carbonate.

8. The process as set forth in claim 1 wherein the optically clear plastic article comprises a material selected from the group consisting of polycarbonates, polyacrylates, polymethacrylates, cellulose acetate, cellulose acetate butyrate, cellulose propionate, homopolymers thereof, and copolymers thereof.

9. The process as set forth in claim 1 wherein the marking composition is a solution of said dye and diluent.

10. The process as set forth in claim 9 wherein the solvent in the solution is selected from the group consisting of esters, alcohols, and ketones.

11. The process as set forth in claim 10 where the diluent in the solution is selected from the group consisting of benzoic acid, salicylic acid, meta-hydroxybenzoic acid, and aromatic carboxylic ester-amides and mixtures thereof.

12. The process as set forth in claim 1 wherein the article comprises allyl diglycol carbonate and the marking composition comprises a solution of ethyl acetate and a crystalline dye selected from the group consisting of 3-phenyl-7-triazinylamino coumarin, stilbene naphthotriazole, benzotriazol phenyl coumarin, thiophene bis (benzoxaxolyl), other fluorescent derivatives of bis (benzoxaxolyl), bis-benzimidazolyl, coumarin, triazinylaminostilbene, benztriazolyl, pyrazoline, bis-styryl benzene and mixtures thereof, and said solid diluent is selected from the group of benzoic acid, salicylic acid, meta-hydroxybenzoic acid and aromatic caboxylic ester-amides and mixtures thereof.

13. The process as set forth in claim 1 wherein the optically clear plastic article comprises allyl diglycol carbonate.

14. The process as set forth in claim 1 wherein the optically clear plastic article comprises a material selected from the group consisting of polycarbonates, polyacrylates, polymethacrylates, cellulose acetate, cellulose acetate butyrate, cellulose propionate, homopolymers thereof, and copolymers thereof.

* * * * *